United States Patent [19]

Jeffries

[11] 3,715,320

[45] Feb. 6, 1973

[54] REDUCTION OF NITRATE ION CONCENTRATION BY FORMALDEHYDE TREATMENT IN THE RECOVERY OF OXIDATION CATALYST METALS

[75] Inventor: Samuel B. Jeffries, Bay City, Tex.

[73] Assignee: Celanese Corporation, New York, N.Y.

[22] Filed: Feb. 11, 1971

[21] Appl. No.: 114,726

[52] U.S. Cl. .................423/24, 252/413, 252/414, 260/537 P, 423/63, 423/390
[51] Int. Cl. ...........................C22b 59/00, B01j 11/02
[58] Field of Search ..........252/414, 413; 260/537 P; 210/38; 23/22, 23; 423/24, 63

[56] References Cited

UNITED STATES PATENTS

| | | | |
|---|---|---|---|
| 3,554,692 | 1/1971 | Brast et al. | 252/412 |
| 3,106,450 | 10/1963 | Sittard | 252/413 |
| 3,148,210 | 9/1964 | Johnson et al. | 252/413 |
| 3,463,740 | 8/1969 | Ketley et al. | 252/411 R |
| 3,186,952 | 1/1965 | Brubaker et al. | 252/413 |

FOREIGN PATENTS OR APPLICATIONS

| | | | |
|---|---|---|---|
| 956,403 | 4/1964 | Great Britain | 252/411 |
| 980,762 | 1/1965 | Great Britain | 252/413 |

*Primary Examiner*—Daniel E. Wyman
*Assistant Examiner*—P. E. Konopka
*Attorney*—Thomas J. Morgan, M. Turken, C. E. Miller and K. A. Genoni

[57] ABSTRACT

An aqueous nitric acid solution such as is derived from an adipic acid process and containing catalyst metal ions is reacted with formaldehyde to remove a substantial portion of the nitrate ions present prior to passing the aqueous nitric acid solution through an ion exchange zone wherein the metals are removed.

8 Claims, No Drawings

REDUCTION OF NITRATE ION CONCENTRATION BY FORMALDEHYDE TREATMENT IN THE RECOVERY OF OXIDATION CATALYST METALS

BACKGROUND OF THE INVENTION

In the production of lower alkyl dicarboxylic acids by nitric acid oxidation there generally results a purge waste stream containing valuable metal ions therein of which recovery is desired if the process is to operate economically. These waste streams are generally derived from the mother liquor of one or more of the crystallizations involved in the production of the dicarboxylic acid and the necessity for purging arises because of the build-up of dibasic acids other than the one desired. For example, in the production of adipic acid small amounts of succinic and glutaric acids are also produced and thus a purge of one of the recycled streams is necessary to prevent build-up of these impurities. The purge stream usually is an aqueous nitric acid solution which contains, in addition to the dibasic acid impurities, other more valuable constituents, namely various metal ions derived from the catalyst used in the oxidation reaction. It is obvious that in view of the value of such catalyst metals recovery of these from the purge stream is desirable before discarding the purge stream.

Various methods, in fact, have been developed for recovery of such metals from these purge streams as may be seen from U.S. Pat. Nos. 3,106,450; 3,186,952; and 3,463,740. Also see British Pat. specification Nos. 980762 and 956403. The most popular of the methods for the recovery of the metals from the purge waste acid streams is by passing this stream through an ion exchange treatment zone whereby the metals are bound to the exchanger and then the metals recovered by passing nitric acid over the exchanger. The stream resulting from the regeneration of the exchanger consists essentially of the nitric acid solution with the metals therein and, therefore, can be recycled to the oxidation process. While such a recovery process as well as the modifications thereof where iron impurities, etc., are also removed, are efficient in recovering the catalyst metals from the aqueous nitric acid solution they do not provide a method for recovery of the nitric acid itself contained in the waste stream. Recovery of the nitric acid is desirable not only for economic reasons but also for environmental maintenance reasons because burning of a waste stream containing nitric acid results in various nitrogen oxides being released into the atmosphere. Further, frequent regeneration of the resin beds is required in the prior art methods. Also, in some of these methods such as that described in U.S. Pat. No. 3,106,450, a water dilution of the purge nitric acid stream is required prior to passing it through the ion exchange treatment zone so as to raise the pH of the stream to a desirable level.

SUMMARY OF THE INVENTION

It is thus an object of the present invention to provide an improvement in a process for the recovery of catalyst metals from a purge waste nitric acid stream whereby the nitric acid contained therein may be recovered. It is the further object of the present invention to provide an improvement in a process for recovering catalyst metals from a nitric acid stream by ion exchange means whereby less frequent regeneration of the ion exchanger is required. It is also an object of the present invention to provide a method for recovering metals from an aqueous nitric acid stream by ion exchange means wherein the necessity for dilution of the stream may be eliminated. Additional objects will become apparent from the following description of the present invention.

These and other objects are accomplished by the present invention which in one of its aspects is an improvement in a process wherein an aqueous nitric acid feed solution containing in solution catalyst metal ions including copper ions is passed through an ion exchange treatment zone for removal of said catalyst metal ions from said feed solution, which improvement comprises the prior step of reacting said feed solution in the liquid phase with formaldehyde so as to substantially reduce the amount of nitrate ions therein.

DETAILED DESCRIPTION OF THE INVENTION

Although the aqueous nitric acid solution reacted with formaldehyde in accordance with the present invention can be practically any aqueous nitric acid solution containing metal ions therein, the invention is most applicable to those aqueous solutions derived from a process in which adipic acid is recovered by crystallization from the product obtained by nitric acid oxidation of cyclohexanol and/or cyclohexanone in the presence of a metal-containing catalyst. Such aqueous nitric acid solutions, as pointed out in the previously cited prior art, generally contain in addition to the nitric acid various amounts of lower alkyl dicarboxylic acids such ad adipic acid, succinic acid and glutaric acid. The presence or absence of such dicarboxylic acids does not, however, affect the present process since these acids are not noticeably affected by the reaction of the stream with formaldehyde and such dicarboxylic acids pass practically completely through the ion exchanger. Such dicarboxylic acids may, if desired, be recovered from the resulting solution in any known manner such as by evaporation or conversion to esters or other derivatives. As far as specific concentrations are concerned, the present invention will be most applicable to the treatment of those aqueous nitric acid solutions containing from about 5 to 40 weight percent of nitric acid, from about 2 to 30 weight percent lower alkyl dicarboxylic acids and 0.05 to 1.5 weight percent metal ions. The particular catalyst metal ions present will depend on the catalyst used in nitric acid oxidation but most often will include copper and also vanadium, especially when adipic acid is being produced. For example, a typical purge waste stream from an adipic acid process will contain by weight 10 to 35 percent nitric acid, 10 to 25 percent lower alkyl dicarboxylic acids (e.g., 5 to 15 percent glutaric, 1 to 10 percent succinic, 1 to 10 percent adipic), 0.1 to 1.0 percent copper and 0.01 to 0.1 percent vanadium, the remainder being essentially water.

Upon reacting the nitric acid solution with the formaldehyde so as to remove the nitrate ions therefrom, carbon dioxide, water and various nitrogen oxides, mainly nitric oxide (NO), are produced. It is recommended that the formaldehyde be used in the reaction in amounts of about 0.2 to 1.5, preferably 0.6 to 0.9, moles per mole of nitrate ion present. Smaller amounts of formaldehyde may be used but will not result in removal of very much of the nitrate ion present. Larger amounts may also be utilized but will result in a waste of formaldehyde because such would be in great excess of the theoretical amount required for complete reaction with the nitrate ions present. The exact theoretical amount of formaldehyde required for complete reaction is not known since there is more than one manner in which the reaction between the formaldehyde and nitric acid might take place. However, it is believed that about 0.75 moles of formaldehyde react with each mole of nitric acid so as to produce carbon dioxide, water and nitrogen oxides. The nitrogen oxides produced are NO and $NO_2$.

The temperature during the reaction of the formaldehyde with the nitric acid solution may vary within the range of about 50° to 200° C. and is preferably within the range of 80° to 140° C. Since the reaction between the formaldehyde and nitric acid solution is exothermic normally no external heat will be necessary to maintain the reaction although a small amount of heating may be used to get the reaction started when speed is desired. The pressure during the reaction needs only to be sufficient to maintain a liquid phase and can be subatmospheric or super-atmospheric, for example, within the range of 0.8 to 20 atmospheres absolute. The time needed for the formaldehyde and nitric acid solution to react will vary depending on reaction conditions but generally a reaction time of 10 minutes to 90 minutes is sufficient, with residence times of about 20 to 40 minutes being sufficient for 90 percent destruction of the nitric acid at temperatures of 125° to 135° C. Usually the purge waste acids obtained from an adipic acid process will have a pH within the range of −0.3 to 0.8 and it is preferred that the reaction be conducted with sufficient formaldehyde and for a period of time sufficient to raise the pH to at least 1.0.

During the reaction of the formaldehyde with the nitric acid solution the gaseous reaction products consisting of carbon dioxide and nitrogen oxides may, of course, easily be separated from the remaining reaction liquid and this liquid further treated by prior art methods for recovery of the metals therefrom. If desired, the gaseous by-products may be processed to produce aqueous nitric acid therefrom by absorbing the nitrogen oxides into water. In absorption of these nitrogen oxides into water, air is preferably added to the gases before the water absorption and the pressure during the absorption should be at least 3.5 atmospheres absolute and is preferably accomplished at about 4.0 to 7.0 atmospheres absolute. Thus, in situations where the gaseous reaction products are to be processed for recovery of nitric acid, then it is preferable to conduct the reaction of the formaldehyde and nitric acid solution at these elevated pressures in order to avoid the necessity for a compressor in the water absorption step. Operation at elevated pressures is also advantageous in that it permits higher reaction temperatures and, therefore, shorter reaction times.

After the reaction of the formaldehyde with the nitric acid solution and removal of the reaction gases there will be left an aqueous solution having a lower nitric acid content that that originally treated. This aqueous solution will also contain the catalyst metals, lower dicarboxylic acids, etc., that were in the original nitric acid stream. This resulting aqueous solution can then be passed through an ion exchange treatment zone for removal of the metals present, such as copper and vanadium. The nature of the ion exchange resin employed in utilizing this invention is not critical, although certain types of resin are generally preferred over others. Any of the hydrogen-form cation exchange resins disclosed in the prior art for recovering metals such as copper and vanadium can be employed. Any resin which can be employed in alternating cycles of metal absorption followed by mineral acid elution as taught in the prior art can also be employed in the present process. For example, U. S. Pat. No. 3,186,952 characterizes the applicable resins broadly as "water-insoluble polymerizate" cation exchange resins, and this term characterizes broadly the resins which are also applicable in the present process. More particularly the resins employed are those having a base comprising sulfonated polyvinyl aryl compounds which are cross-linked with a divinyl aryl compound. Specifically preferred resins include those which comprise sulfonated polystyrene cross-linked with divinylbenzene in an amount of about 8 to 25 weight percent based on the weight of the resin. Commercially available resins include "Amberlite IR–200" manufactured by Rohm and Haas Company and "Dowex 50WX8," "Dowex 50X16," and "Dow SA1101.1," all manufactured by Dow Chemical Company. Many other similar resins are manufactured and can be utilized in the present process, but the resins just named are typical and illustrate the recommended materials. "Amerlite IR–200" has been found to be particularly suitable.

The geometry of the resin bed, and the space velocity to be employed in passing the aqueous feed solution through it, are not critical, nor is the particle size of the resin.

The bed is, of course, activated to its hydrogen form by treatment with a strong acid prior to passing the aqueous feed solution through it. When the ion exchange resin is exhausted as indicated by breakthrough of the metals, it may be regenerated by known methods particularly by passing aqueous nitric acid solution therethrough. The eluate will then be a nitric acid solution of the metal ions and will be a suitable source of catalyst for a nitric acid oxidation process.

The fact that nitric acid is used to regenerate an ion exchange resin bed containing metal ions is the reason that the present invention increases the amount of metals that may be retained on a given amount of exchange resin. That is, the present invention accomplishes removal of the nitric acid before the stream passes through the bed and, therefore, the nitric acid so removed is not attempting to regenerate the bed and free the metal ions at the same time that one is trying to retain these metal ions. In other words, since nitric acid is a "regenerator" it is preferably not present when one is attempting to bend the catalyst metals to the exchange resins. If the reaction of the formaldehyde and the aqueous nitric acid solution are conducted at elevated temperatures above 50° C. then the liquid reaction product is preferably cooled to below 50° C. before passing it through the ion exchange treatment zone. The reason for this is that there may be a tendency toward resin deterioration above about 50° C.

EXAMPLE I

An experiment was conducted for the continuous treatment of an aqueous nitric acid feed solution so as to recover the catalyst metals therefrom. The aqueous nitric acid feed solution was a purge stream from an adipic acid process wherein mixtures of cyclohexanol and cyclohexanone were oxidized with nitric acid in the presence of a copper-vanadium catalyst. The aqueous nitric acid feed stream contained about 26.7 weight percent nitric acid, 11.3 weight percent glutaric acid, 4.3 weight percent succinic acid, 3.8 weight percent adipic acid, 0.5 weight percent copper and 0.05 weight percent vanadium.

The apparatus for treatment of the aqueous nitric acid feed stream consisted of a feed reservoir and pump flowing into a stirred and heated reaction flask holding 500 ml. of liquid with a condenser and receiver on the gas vent. The reactor liquid overflowed into another heated flask without a stirrer, then overflowed into a product receiver. The liquid level in both reaction flasks was adjustable in order to vary residence time. Two reactors in series were used in order to reduce short-circuiting of the reactants and more nearly approach completion of the reaction.

In making the run a 37 weight percent formalin solution was mixed with the aqueous nitric acid feed stream just prior to the mixture being fed to the first reaction flask, the formalin solution being used in an amount such that the mole ratio of formaldehyde to nitric acid was 0.8. The rate of feed to the flask was maintained at about 10 ml. per minute with the level in the reaction flasks being maintained such that the residence time of the reactants in the first flask was about 50 minutes and in the second flask was about 60 minutes for a total reaction time of 110 minutes. The first flask was maintained at about 96° C. and the second flask at 97° C. After steady state conditions were reached samples were taken from the first flask and from the product receiver. Analysis of the samples showed the nitric acid content of the liquid in the first flask to be 3.5 grams per 100 ml. of solution and the the nitric acid content of the product from the product receiver to be 1.6 grams per 100 ml. of solution. Also the final product has a pH of 2.1. Calculations showed that 95 percent of the nitric acid had been destroyed by the formaldehyde treatment with the metal components and dibasic acid components essentially unaffected. It is also pointed out that the volume of the liquid product was less than total liquid fed to the first reaction flask due to the water vaporized with the large amount of gases evolved during the reaction.

Product obtained from the above-described run was then passed through an ion exchange resin bed prepared from fresh Amberlite IR-200 resin and activated with 30 percent aqueous nitric acid. Amerlite IR-200 is manufactured by Rohm and Haas and is a sulfonated polystyrene crosslinked with divinylbenzene. The bed was 1.25 inches in diameter, 11 inches long and contained 240 grams (275 ml.) of wet resin. Feed rate to the bed was about 800 ml. per hour and residence time was about 17 minutes. The efflux from the bed was caught in batches and analyzed for copper and vanadium. The run was continued until the bed appeared to be nearly saturated with copper, a total of 1,800 grams having been fed to the bed. The bed was then washed with a first water wash, followed by a regeneration step of passing 621 grams of 30 percent aqueous nitric acid therethrough, and finally a second water wash. The results of this ion exchange recovery of metals is shown in Table I following.

TABLE I

|  | Grams | Copper wt. % | Vanadium wt. % |
|---|---|---|---|
| Feed, | 1800 | .604 | .052 |
| Efflux Cuts From Bed | 320 | .01 | .001 |
|  | 329 | .01 | .003 |
|  | 277 | .01 | .004 |
|  | 211 | .01 | .006 |
|  | 229 | .01 | .010 |
|  | 115 | .01 | .013 |
|  | 123 | .01 | .19 |
|  | 105 | .01 | .033 |
|  | 79 | .01 | .045 |
| First Wash | 319 | .02 | .027 |
| Regenerant | 621 | 1.69 | .106 |
| Second Wash | 280 | .08 | .005 |

| Percent of Fed Metals Found In | | |
|---|---|---|
| Efflux | 0.1 | 19.0 |
| First Wash | 0.15 | 9.1 |
| Regenerant | 96.8 | 70.0 |
| Second Wash | 0.2 | 1.5 |
| Accountability % | 97.3 | 99.6 |

As can be seen from Table I the recovery of copper was very good although vanadium started to bleeding through the bed quite early in the run. The bleeding through of vanadium prior to copper is common in these type processes and, accordingly, in many applications two beds in series are utilized so that the vanadium bleedingthrough the first resin bed is retained in the second resin bed.

EXAMPLE II

In a continuous process, a purge waste acid having a composition similar to that of the feed solution in Example I except that the nitric acid content was only 20.2 percent was mixed with a 37 weight percent formalin solution and then the mixture immediately passed to a one-liter stainless steel bomb maintained at about 137° C. and 4.4 atmospheres absolute. The formalin solution was used in amounts such that the mole ratio of formaldehyde to nitric acid was 0.75 and the feed rate of the mixture to the reactor was about 38.5 ml/min such that the residence time in the reactor was 13 minutes. The liquid reaction products and the gaseous reaction products were withdrawn from the reactor separately, the latter at the rate of about 4.25 liters/min. The total liquid fed to the reactor over the course of the experiment was 5,780 ml. and the total liquid product was 5,030 ml. This liquid product contained about 2.4 weight percent nitric acid and calculations indicated 89 percent of the nitric acid in the feed had been destroyed.

The embodiments of the invention in which an exclusive property or privilege is claimed are defined as follows:

1. In a process wherein an aqueous nitric acid feed solution containing in solution catalyst metal ions consisting essentially of copper and vanadium is passed through an ion exchange treatment zone for removal of said catalyst metal ions from said feed solution, and wherein said metal ions are subsequently recovered from said ion exchange treatment zone in a nitric acid eluate solution, the improvement which comprises reacting said feed solution in the liquid phase with formaldehyde prior to passing said feed solution through said ion exchange treatment zone so as to substantially reduce the amount of nitrate ions therein.

2. The process of claim 1 wherein the reaction of said feed solution with formaldehyde is conducted at temperatures with the range of 50° to 200° C.

3. The process of claim 1 wherein there are from 0.6 to 0.9 moles of formaldehyde reacted with said aqueous nitric acid feed solution per mole of nitrate ion contained therein.

4. The process of claim 1 wherein said feed solution is derived from a process in which adipic acid is recovered by crystallization from the product obtained by nitric acid oxidation of of cyclohexanone, cyclohexanol or mixtures thereof, and said feed solution contains copper ions, vanadium ions and lower alkyl dicarboxylic acids.

5. The process of claim 4 wherein from 0.6 to 0.9 moles of formaldehyde are reacted with said feed solution per mole of nitrate ion contained therein.

6. The process of claim 5 wherein said aqueous nitric acid feed solution contains by weight from about 10 to 35 percent nitric acid, 10 to 25 percent lower alkyl dicarboxylic acids, 0.1 to 1.0 percent copper and 0.01 to 0.1 percent vanadium.

7. The process of claim 6 wherein the reaction of the formaldehyde and said feed solution is conducted at a temperature within the range of about 80° to 140° C.

8. The process of claim 7 wherein the pH of said feed solution is within the range of −0.3 to 0.8 and wherein said reaction is conducted for a time sufficient to remove enough nitrate ion to raise the pH of the feed solution to at least 1.0.

* * * * *